United States Patent
Spillman, III

(10) Patent No.: US 7,924,999 B1
(45) Date of Patent: Apr. 12, 2011

(54) USING REMOTE PROCESSORS TO GENERATE ROUTING INFORMATION TO TERMINATE CALLS TO A CUSTOMER PREMISES

(75) Inventor: Roy Robert Spillman, III, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1946 days.

(21) Appl. No.: 10/964,271

(22) Filed: Oct. 13, 2004

(51) Int. Cl.
*H04M 7/00* (2006.01)

(52) U.S. Cl. ......... 379/221.09; 379/142.07; 379/220.01; 379/221.12; 379/221.13; 379/219; 370/244; 370/250; 370/335; 370/342

(58) Field of Classification Search ............... 379/93.05, 379/221.09, 221.14, 142.07, 220.01, 221.12, 379/221.13, 219, 258; 370/244, 250, 335, 370/342

See application file for complete search history.

(56) References Cited

U.S. PATENT DOCUMENTS

| 6,470,081 B1 * | 10/2002 | Sbisa et al. ............... 379/221.09 |
| 6,856,598 B1 * | 2/2005 | Stanfield ....................... 370/235 |
| 2008/0025295 A1 * | 1/2008 | Elliott et al. .................. 370/356 |

OTHER PUBLICATIONS

U.S. Appl. No. 10/047,298, filed Jan. 15, 2002.
U.S. Appl. No. 10/403,160, filed Mar. 31, 2003.
U.S. Appl. No. 10/452,897, filed Jun. 2, 2003.

* cited by examiner

*Primary Examiner* — Melur Ramakrishnaiah
*Assistant Examiner* — Yosef K Laekemariam

(57) ABSTRACT

A communication system is described that comprises a switching system, an SCP, and a customer premises. The customer premises includes a remote processor and a plurality of terminating devices. When in operation, the switching system receives a call. Because of the type of call, the switching system queries the SCP for routing information on where to route the call, and the SCP queries the remote processor in the customer premises. The remote processor processes the query to determine routing information to route the call to a terminating device in the customer premises. The remote processor generates a code that includes the routing information and transmits the code to the SCP. The SCP processes the code to identify the routing information determined by the remote processor. The SCP then transmits the routing information to the switching system to cause the switching system to route the call to the terminating device.

52 Claims, 6 Drawing Sheets

| TRANSLATION TABLE 300 | | | |
| --- | --- | --- | --- |
| LABEL | TERM.SW | TERM TRUNK | DNIS DIGITS |
| TERMDEV 123 | 1111 | 2221 | 333331 |
| TERMDEV124 | 1112 | 2222 | 333332 |
| TERMDEV 125 | 1113 | 2223 | 333333 |
| ⋮ | ⋮ | ⋮ | ⋮ |
| TERMDEV NNN | XXXX | YYYY | ZZZZZZ |

*PRIOR ART*
*FIG. 3*

USING REMOTE PROCESSORS TO GENERATE ROUTING INFORMATION TO TERMINATE CALLS TO A CUSTOMER PREMISES

BACKGROUND OF THE INVENTION

1. Field of the Invention

The invention is related to the field of communications, and in particular, to generating routing information in a remote processor of a customer premises for terminating calls to devices in the customer premises.

2. Description of the Prior Art

When a switch in a telecommunication network receives a call, the switch processes the dialed number and other information to determine where to route the call. If the switch is unable to determine where to route the call, the switch queries a Service Control Point (SCP) for routing information. The SCP is controlled by the service provider and is configured to respond to the query from the switch with the appropriate routing information.

Some service providers offer the customer the ability to intelligently route calls within their site. For instance, Sprint offers a service called Site RP® that provides customers intelligent routing capabilities within their site. Site RP® and similar intelligent routing services are typically used in call centers and other sites that have multiple numbers and multiple terminating devices. With intelligent routing services, the SCP queries a customer's remote processor for routing information on where to route the call.

A typical remote processor processes a query from the SCP to select one or more terminating devices for terminating the call in the customer premises. Responsive to selecting a terminating device, the remote processor identifies a label designated for that terminating device. The label is generally a ten character alpha-numeric label. The remote processor then responds to the query from the SCP with the label identifying the selected terminating device.

The SCP enters the label into a translation table to translate the label into routing information for the call. Based on the entered label, the translation table yields routing information for the call, such as a terminating switch for the call, a terminating trunk for the call, and/or Dialed Number Information Service (DNIS) digits. The SCP then responds to the query from the switch with routing information obtained from the translation table.

One problem is that the SCP needs to use a static translation table to translate the label provided by the remote processor into routing information. If the customer wants to change the translations in the table such as to add new terminating devices, the customer contacts the service provider with the changes. The service provider then updates the translation table with the changes. Unfortunately, the service provider typically takes three to five days to update the translation table. Such a turn around time can be a problem when the customer desires real-time changes, such as in emergency situations.

SUMMARY OF THE INVENTION

The above and other problems are solved by having the remote processor generate the routing information for a call and provide the routing information to an SCP in the form of a code. By having the remote processor generate the routing information, the customer can dynamically change the routing information through the remote processor. For instance, the customer can dynamically change which terminating device(s) handle a call to a particular telephone number by changing the DNIS digits assigned to that number. The customer can also add new terminating devices for handling calls by adding DNIS digits for the new terminating devices. The customer can advantageously update the remote processor in substantially real-time to alter routing within the customer premises without having to update the SCP of the service provider. The customer avoids the time it takes for the service provider to update the translation table in the SCP.

One embodiment of the invention includes a communication system that comprises a switching system, an SCP, and a customer premises. The customer premises includes a remote processor and a plurality of terminating devices. When in operation, the switching system receives a call. Because of the type of call (such as a toll free call), the switching system queries the SCP for routing information on where to route the call. The SCP then queries the remote processor in the customer premises for routing information on where to route the call. The remote processor receives the query from the SCP and processes the query to determine routing information to route the call to a terminating device in the customer premises. The remote processor generates a code that includes the routing information and transmits the code to the SCP. The SCP processes the code received from the remote processor to identify the routing information determined by the remote processor. The SCP then transmits the routing information to the switching system to cause the switching system to route the call to the terminating device.

The invention may include other embodiments described below.

BRIEF DESCRIPTION OF THE DRAWINGS

The same reference number represents the same element on all drawings.

FIG. 3 illustrates a translation table in the prior art.

DETAILED DESCRIPTION OF THE INVENTION

Figure 1:
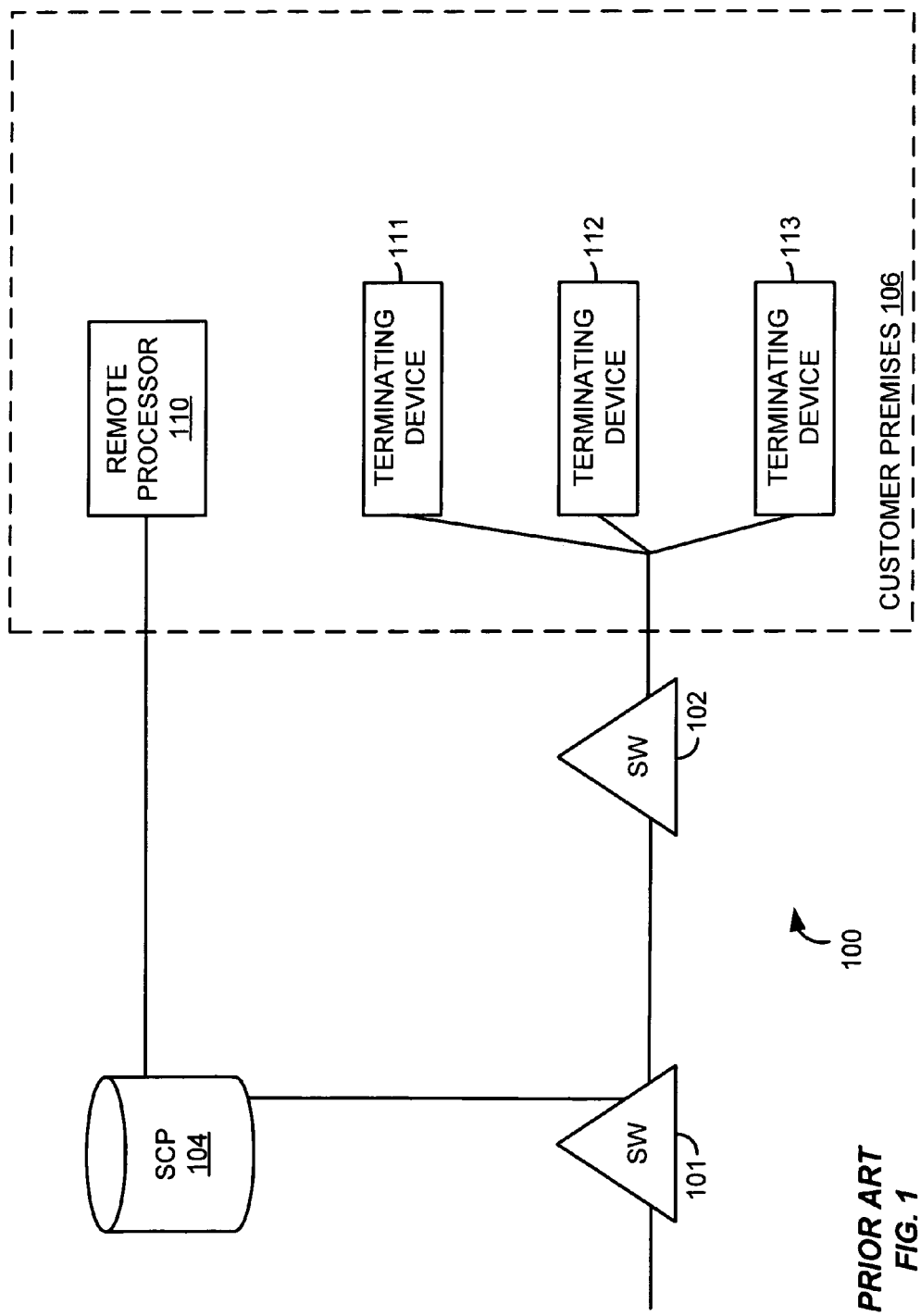
FIG. 1 illustrates a communication system in the prior art.
Figure 2:
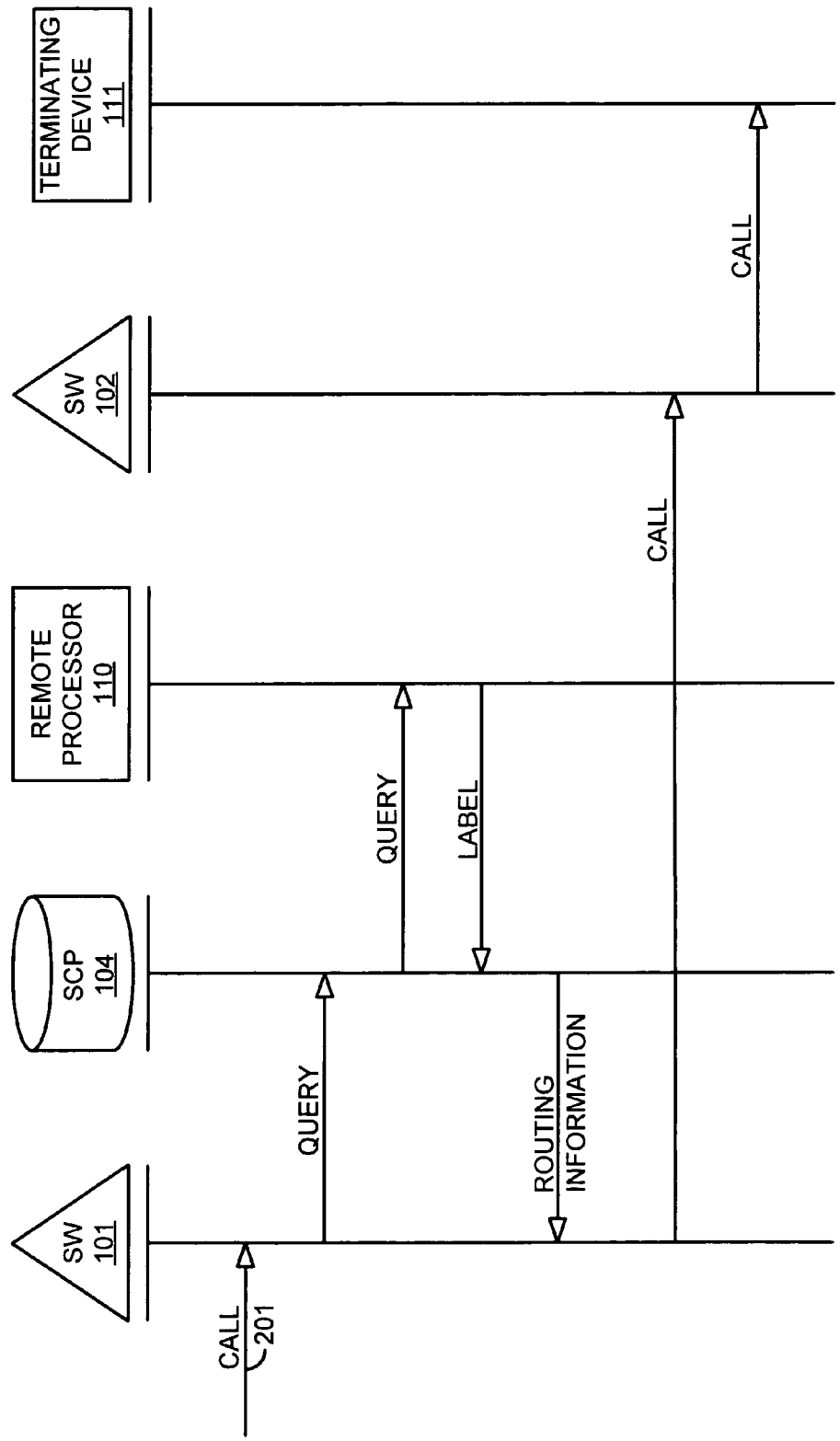
FIG. 2 is a diagram illustrating the operation of the communication system of FIG. 1 in the prior art.

Prior Art—FIGS. 1-3

FIG. 1 illustrates a communication system 100 in the prior art. Communication system 100 comprises switches 101-102, Service Control Point (SCP) 104, and customer premises 106. Customer premises 106 includes a remote processor 110 and terminating devices 111-113. Customer premises 106 may comprise a call center or similar entity where terminating devices 111-113 each comprise a call agent station with a telephone, a computer, and/or other equipment (not shown). Remote processor 110 is able to direct call routing to terminating devices 111-113 in customer premises 106.

FIG. 2 is a diagram illustrating the operation of communication system 100 in the prior art. When in operation, switch 101 receives a call. Because of the type of call (such as a toll free call), switch 101 may not know where to route the call.

Therefore, switch 101 queries SCP 104 for routing information on where to route the call. SCP 104 then queries remote processor 110 for routing information on where to route the call.

Remote processor 110 processes the query to select one or more terminating devices 111-113 for terminating the call. Remote processor 110 may select a terminating device 111-113 based on a dialed number that SCP 104 included with the query. Remote processor 110 may also select a terminating device 111-113 based on the availability of terminating devices 111-113, or other criteria. Responsive to selecting a terminating device (assume terminating device 111), remote processor 110 identifies a label designated for terminating device 111. The label is generally a ten character alpha-numeric label. Remote processor 110 then responds to the query from SCP 104 with the label identifying the selected terminating device 111.

SCP 104 receives the label from remote processor 110. SCP 104 processes the label based on a translation table in order to translate the label into routing information for the call. FIG. 3 illustrates a translation table 300 in the prior art. SCP 104 enters the label received from remote processor 110 into translation table 300. Based on the entered label, translation table 300 yields routing information for the call, such as a terminating switch for the call, a terminating trunk for the call, and Dialed Number Information Service (DNIS) digits. For instance, if SCP 104 receives the label "TERMDEV123", then translation table 300 yields "1111" as the terminating switch, "1112" as the terminating trunk, and "333331" as the DNIS digits. SCP 104 then responds to the query from switch 101 with routing information for the call.

Responsive to receiving the routing information from SCP 104, switch 101 processes the routing information to route the call to switch 102. Switch 102 then routes the call to terminating device 111. Terminating device 111 may then handle the call.

Unfortunately, SCP 104 needs to use static translation table 300 to translate the label provided by remote processor 110 into routing information. If changes to translation table 300 need to be made, the changes typically take three to five days to be implemented in the translation table. Such a turn around time can be a problem when the customer desires real-time changes, such as in emergency situations.

Description of the Invention—FIGS. 4-7

FIGS. 4-7 and the following description depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 4:
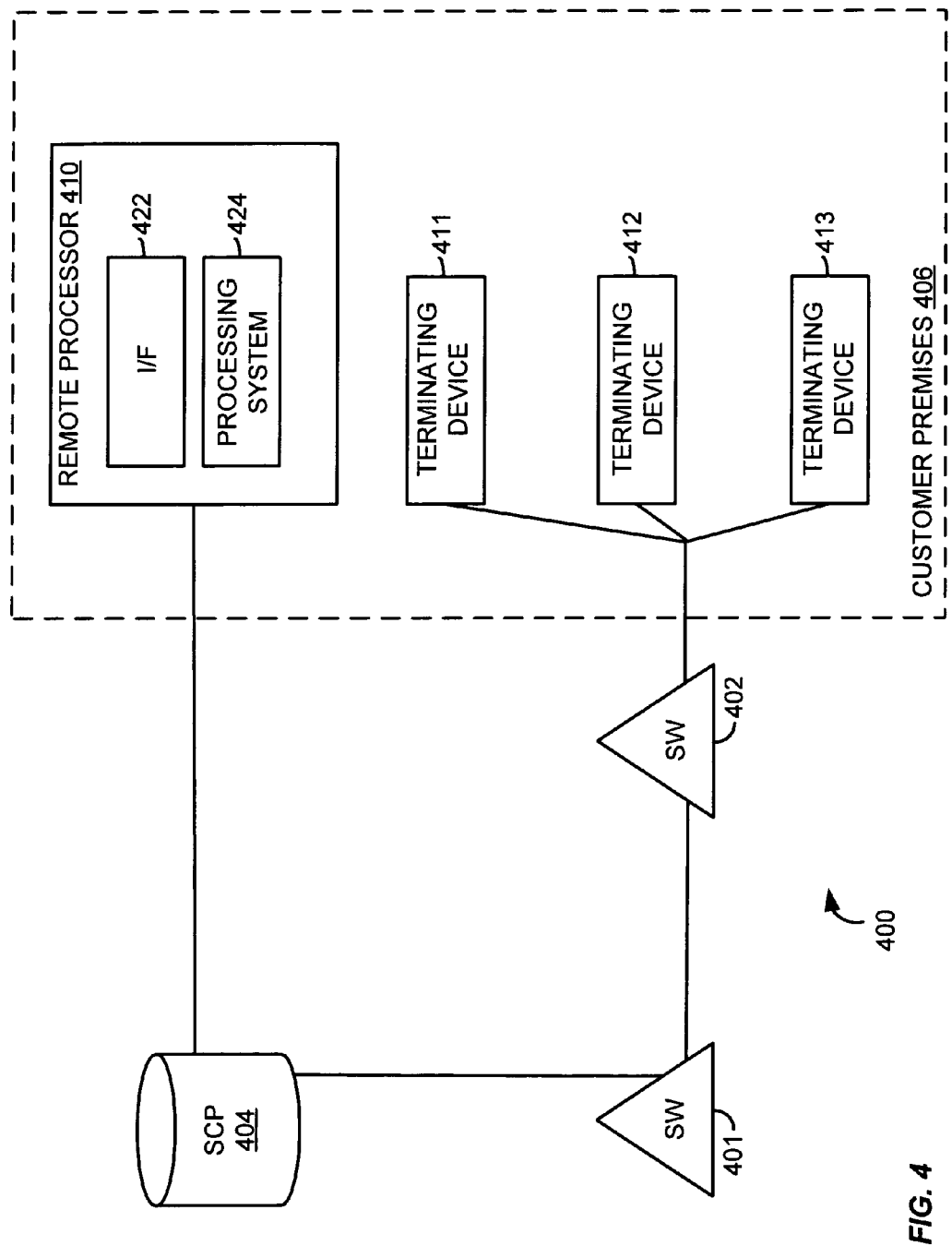
FIG. 4 illustrates a communication system in an exemplary embodiment of the invention.

FIG. 4 illustrates a communication system 400 in an exemplary embodiment of the invention. Communication system 400 comprises switching systems 401-402, a Service Control Point (SCP) 404, and customer premises 406. Customer premises 406 includes a remote processor 410 and terminating devices 411-413. Communication system 400 may include other devices or systems not shown in FIG. 4. For instance, customer premises 406 may include multiple other terminating devices 411-413 and remote processors 410 than those shown in FIG. 4. Remote processor 410 includes an interface 422 and a processing system 424.

Switching system 401 is connected to switching system 402 and SCP 404. SCP 404 is connected to remote processor 410. Switching system 402 is connected to terminating devices 411-413. Interface 422 is connected to processing system 424. Within customer premises 406, remote processor 410 may be connected to terminating devices 411-413 although not shown in FIG. 4.

A customer premises comprises any building, campus, or other area that includes customer premises equipment, such as a remote processor and terminating devices. A terminating device comprises a phone, computer, workstation, and/or another other system or equipment capable of terminating a call. For instance, customer premises 406 in FIG. 4 may comprise a call center or similar entity where terminating devices 411-413 each comprise a call agent station with a telephone, a computer, and/or other equipment (not shown).

Figure 5:
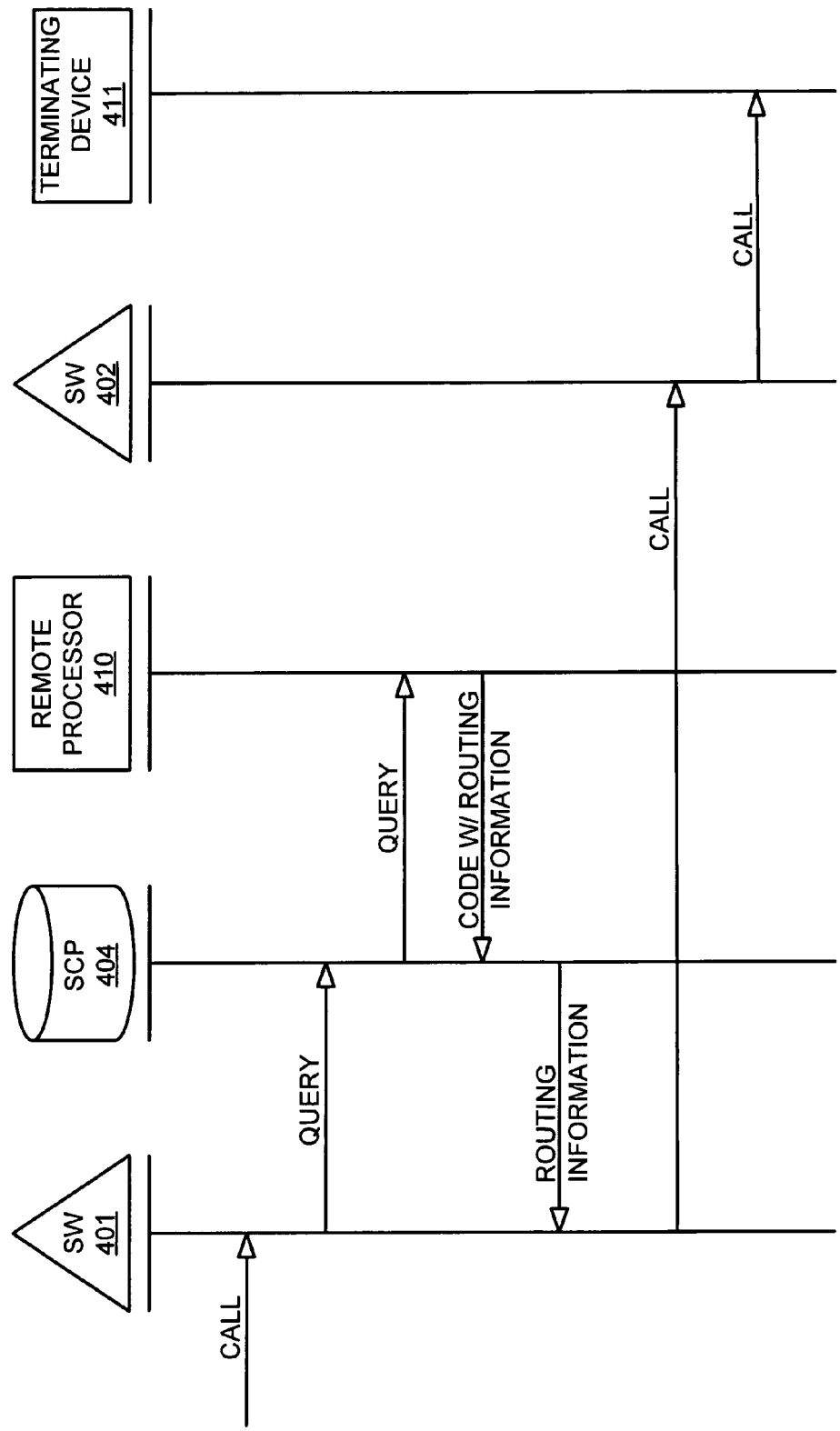
FIG. 5 is a diagram illustrating the operation of the communication system of FIG. 4 in an exemplary embodiment of the invention.

FIG. 5 is a diagram illustrating the operation of communication system 400 in an exemplary embodiment of the invention. When in operation, switching system 401 receives a call. Because of the type of call (such as a toll free call), switching system 401 may not know where to route the call. Therefore, switching system 401 queries SCP 404 for routing information on where to route the call. SCP 404 then queries remote processor 410 for routing information on where to route the call.

Processing system 424 in remote processor 410 receives the query from SCP 404 through interface 422. Processing system 424 processes the query to determine routing information to route the call to a terminating device 411-413 (assume terminating device 411). Processing system 424 generates a code that includes the routing information and transmits the code to SCP 404. Processing system 424 may transmit the code through interface 422.

SCP 404 processes the code received from remote processor 410 to identify the routing information determined by remote processor 410. SCP 404 then transmits the routing information to switching system 401 to cause switching system 401 to route the call to terminating device 411. SCP 404 may be able to just pull the routing information out of the code received from remote processor 410. If the code includes a telephone number, then SCP 404 may have to determine routing information for that telephone number. In any event, SCP 404 does not process codes based on a pre-defined translation table in order to translate the codes into routing information for each call.

In one embodiment of the invention, remote processor 410 determines routing information for terminating a call to one of the terminating devices 411-413 based on the following. Processing system 424 in remote processor 410 selects one or more terminating devices 411-413 for terminating the call. Processing system 424 may select a terminating device 411-413 based on a dialed number that SCP 404 included with the query. Processing system 424 may also select a terminating device 411-413 based on the availability of terminating devices 411-413, or other criteria.

Responsive to selecting a terminating device (assume terminating device 411), processing system 424 determines whether termination of the call to terminating device 411 is over a dedicated circuit. Terminating device 411 may be connected via a dedicated connection or a normal switched connection. If termination of the call to terminating device 411 is over a dedicated circuit, then processing system 424 identifies a terminating switching system 402 for terminating the call to terminating device 411. Processing system 424 may also identify a trunk for terminating the call from terminating switching system 402. Processing system 424 may also identify Dialed Number Information Service (DNIS) digits corresponding with terminating device 411.

If termination of the call to terminating device 411 is not over a dedicated circuit, then processing system 424 identifies a telephone number of terminating device 424.

Figure 6:
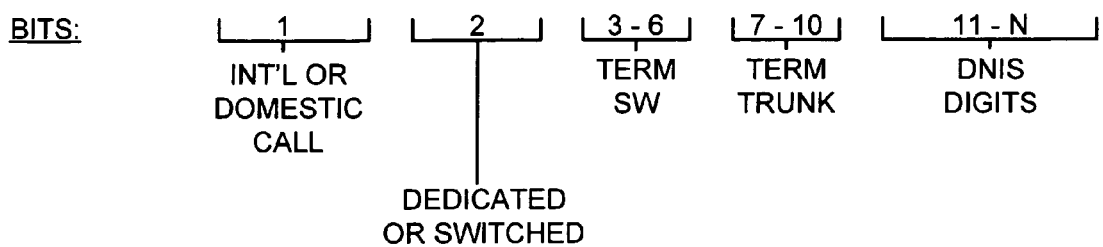
FIG. 6 illustrates a sample code in an exemplary embodiment of the invention.

When the routing information is determined by processing system 424, processing system 424 generates a code based on the routing information. The code is preferably variable in length to accommodate different types of routing information. FIG. 6 illustrates a sample code in an exemplary embodiment of the invention. In FIG. 6, the first digit of the code includes an indicator whether the call comprises a domestic call or an international call. The second digit of the code includes an indicator that termination of the call is over a dedicated circuit. Digits 3-6 of the code identify a switch identifier for the terminating switch. Digits 7-10 of the code identify a trunk identifier for the trunk used to terminate the call from the terminating switch. Digits 11-N indicate Dialed Number Information Service (DNIS) digits corresponding with the terminating device. The number of DNIS digits may vary.

As an example, assume that remote processor 410 of FIG. 4 generates the code "01012304567891XXXXXX". The first digit "0" indicates that the termination is domestic. The second digit "1" indicates that termination is a dedicated circuit. The third through sixth digits "0123" identify the terminating switch. The seventh through tenth digits "0456" identify the trunk to transmit the call at the terminating switch. The remaining digits indicate the DNIS digits to out-pulse. In this example, digits "7891" represent a four digit DNIS being out-pulsed. The "X's" represent the additional digits that could be out-pulsed based on the fact that out-pulsed digits for DNIS could be up to ten digits in length, or more in future uses.

Figure 7:
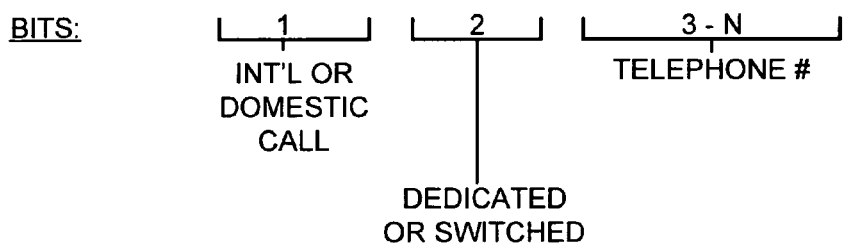
FIG. 7 illustrates another sample code in an exemplary embodiment of the invention.

FIG. 7 illustrates another sample code in an exemplary embodiment of the invention. In FIG. 7, the first digit of the code includes an indicator whether the call comprises a domestic call or an international call. The second digit of the code indicates that termination of the call is over a normal switched connection. Digits 3-N of the code indicates a telephone number for the terminating device.

Remote processor 410 of FIG. 4 may be comprised of instructions that are stored on storage media and executed by processing system 424. The instructions can be retrieved and executed by processor system 424. Some examples of instructions are software, program code, and firmware. Some examples of storage media are memory devices, tape, disks, integrated circuits, and servers. The instructions are operational when executed by processing system 424 to direct processor system 424 to operate in accord with the invention. The term "processing system" refers to a single processing device or a group of inter-operational processing devices. Some examples of processing systems are computers, integrated circuits, and logic circuitry. Those skilled in the art are familiar with instructions, processors, and storage media.

What is claimed is:

1. A communication system, comprising:
    a remote processor of a customer premises; and
    a Service Control Point (SCP) that receives a first query for routing information for routing a call from a switching system that receives the call, and transmits a second query to the remote processor;
    the remote processor processes the second query to determine the routing information to route the call to a terminating device in the customer premises, generates a code that includes the routing information, and transmits the code to the SCP;
    the SCP processes the code without using a pre-defined translation table to determine the routing information and transmits the routing information to the switching system to route the call to the terminating device in the customer premises.

2. The communication system of claim 1 wherein the remote processor selects the terminating device and determines whether termination of the call to the terminating device is over a dedicated circuit.

3. The communication system of claim 2 wherein:
    if termination of the call to the terminating device is over a dedicated circuit, then the remote processor determines the routing information by identifying a terminating switch for terminating the call to the terminating device.

4. The communication system of claim 3 wherein the remote processor determines the routing information by identifying a trunk for terminating the call out of the terminating switch.

5. The communication system of claim 4 wherein the remote processor determines the routing information by identifying Dialed Number Information Service (DNIS) digits corresponding with the terminating device.

6. The communication system of claim 2 wherein:
    if termination of the call to the terminating device is not over a dedicated circuit, then the remote processor determines the routing information by identifying a telephone number of the terminating device.

7. The communication system of claim 1 wherein the code indicates whether the call comprises a domestic call or an international call.

8. The communication system of claim 7 wherein the code indicates whether the termination of the call comprises a dedicated circuit.

9. The communication system of claim 8 wherein the code includes a switch identifier for the terminating switch.

10. The communication system of claim 9 wherein the code includes a trunk identifier for the trunk dedicated out of the terminating switch.

11. The communication system of claim 10 wherein the code includes Dialed Number Information Service (DNIS) digits corresponding with the terminating device.

12. The communication system of claim 8 wherein the code includes a telephone number for the terminating device.

13. The communication system of claim 1 wherein the code is variable length.

14. A method of operating a communication system, wherein the communication system includes a switching system, a Service Control Point (SCP), and a remote processor of a customer premises, the method comprising:
    receiving a first query in the SCP from the switching system that receives a call, wherein the first query is for routing information for routing the call;
    transmitting a second query from the SCP to the remote processor;
    processing the second query in the remote processor to determine the routing information for routing the call to a terminating device in the customer premises;
    generating a code that includes the routing information;
    transmitting the code from the remote processor to the SCP;
    processing the code in the SCP without using a pre-defined translation table to determine the routing information; and
    transmitting the routing information to the switching system to route the call to the terminating device in the customer premises.

15. The method of claim 14 further comprising:
in the remote processor, selecting the terminating device, and determining whether termination of the call to the terminating device is over a dedicated circuit.

16. The method of claim 15 wherein if termination of the call to the terminating device is over a dedicated circuit, then the step of determining the routing information in the remote processor comprises:
identifying a terminating switch for terminating the call to the terminating device.

17. The method of claim 16 wherein the step of determining the routing information in the remote processor comprises:
identifying a trunk for terminating the call out of the terminating switch.

18. The method of claim 17 wherein the step of determining the routing information in the remote processor comprises:
identifying Dialed Number Information Service (DNIS) digits corresponding with the terminating device.

19. The method of claim 15 wherein if termination of the call to the terminating device is not over a dedicated circuit, then the step of determining the routing information in the remote processor comprises:
identifying a telephone number of the terminating device.

20. The method of claim 14 wherein the code indicates whether the call comprises a domestic call or an international call.

21. The method of claim 20 wherein the code indicates whether the termination of the call comprises a dedicated circuit.

22. The method of claim 21 wherein the code includes a switch identifier for the terminating switch.

23. The method of claim 22 wherein the code includes a trunk identifier for the trunk dedicated out of the terminating switch.

24. The method of claim 23 wherein the code includes Dialed Number Information Service (DNIS) digits corresponding with the terminating device.

25. The method of claim 21 wherein the code includes a telephone number for the terminating device.

26. The method of claim 14 wherein the code is variable length.

27. A remote processor of a customer premises, the remote processor comprising:
an interface configured to receive a query from a Service Control Point (SCP), wherein the query is for routing information for routing a call received by a switching system; and
a processing system configured to process the query to determine the routing information to route the call to a terminating device in the customer premises, generate a code that includes the routing information, and transmit the code to the SCP wherein the SCP is configured to process the code without using a pre-defined translation table to determine the routing information.

28. The remote processor of claim 27 wherein the processing system is configured to select the terminating device and determine whether termination of the call to the terminating device is over a dedicated circuit.

29. The remote processor of claim 28 wherein:
if termination of the call to the terminating device is over a dedicated circuit, then the processing system is configured to determine the routing information by identifying a terminating switch for terminating the call to the terminating device.

30. The remote processor of claim 29 wherein the processing system is configured to determine the routing information by identifying a trunk for terminating the call out of the terminating switch.

31. The remote processor of claim 30 wherein the processing system is configured to determine the routing information by identifying Dialed Number Information Service (DNIS) digits corresponding with the terminating device.

32. The remote processor of claim 28 wherein:
if termination of the call to the terminating device is not over a dedicated circuit, then the processing system is configured to determine the routing information by identifying a telephone number of the terminating device.

33. The remote processor of claim 27 wherein the code indicates whether the call comprises a domestic call or an international call.

34. The remote processor of claim 33 wherein the code indicates whether the termination of the call comprises a dedicated circuit.

35. The remote processor of claim 34 wherein the code includes a switch identifier for the terminating switch.

36. The remote processor of claim 35 wherein the code includes a trunk identifier for the trunk dedicated out of the terminating switch.

37. The remote processor of claim 36 wherein the code includes Dialed Number Information Service (DNIS) digits corresponding with the terminating device.

38. The remote processor of claim 34 wherein the code includes a telephone number for the terminating device.

39. The remote processor of claim 27 wherein the code is variable length.

40. A method of operating a remote processor of a customer premises, the method comprising:
receiving a query from a Service Control Point (SCP), wherein the query is for routing information for routing a call received by a switching system;
processing the query to determine the routing information for routing the call to a terminating device in the customer premises;
generating a code that includes the routing information; and
transmitting the code to the SCP wherein the SCP is configured to process the code without using a pre-defined translation table to determine the routing information.

41. The method of claim 40 further comprising:
selecting the terminating device; and
determining whether termination of the call to the terminating device is over a dedicated circuit.

42. The method of claim 41 wherein if termination of the call to the terminating device is over a dedicated circuit, then the step of determining the routing information comprises:
identifying a terminating switch for terminating the call out of the terminating device.

43. The method of claim 42 wherein the step of determining the routing information comprises:
identifying a trunk for terminating the call to the terminating switch.

44. The method of claim 43 wherein the step of determining the routing information comprises:
identifying Dialed Number Information Service (DNIS) digits corresponding with the terminating device.

45. The method of claim 41 wherein if termination of the call to the terminating device is not over a dedicated circuit, then the step of determining the routing information comprises:
identifying a telephone number of the terminating device.

46. The method of claim 40 wherein the code indicates whether the call comprises a domestic call or an international call.

47. The method of claim 46 wherein the code indicates whether the termination of the call comprises a dedicated circuit.

48. The method of claim 47 wherein the code includes a switch identifier for the terminating switch.

49. The method of claim 48 wherein the code includes a trunk identifier for the trunk dedicated out of the terminating switch.

50. The method of claim 49 wherein the code includes Dialed Number Information Service (DNIS) digits corresponding with the terminating device.

51. The method of claim 47 wherein the code includes a telephone number for the terminating device.

52. The method of claim 40 wherein the code is variable length.

* * * * *